(12) United States Patent
Amrany et al.

(10) Patent No.: US 6,427,179 B1
(45) Date of Patent: Jul. 30, 2002

(54) SYSTEM AND METHOD FOR PROTOCOL CONVERSION IN A COMMUNICATIONS SYSTEM

(75) Inventors: Daniel Amrany, Ocean Township; Lazslo Arato, Tinton Falls, both of NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/164,969

(22) Filed: Oct. 1, 1998

Related U.S. Application Data

(60) Provisional application No. 60/060,651, filed on Oct. 1, 1997.

(51) Int. Cl.[7] .............................................. G06F 13/14
(52) U.S. Cl. ........................ 710/64; 713/100; 712/300
(58) Field of Search ................... 710/64, 11; 713/100; 712/300

(56) References Cited

U.S. PATENT DOCUMENTS

| | | | | |
|---|---|---|---|---|
| 3,577,189 A | * | 5/1971 | Cocke et al. ............... | 395/395 |
| 3,926,087 A | * | 12/1975 | Griffis ........................ | 84/345 |
| 4,500,933 A | * | 2/1985 | Chan .......................... | 360/69 |
| 4,972,470 A | * | 11/1990 | Farago ........................ | 380/3 |
| 5,341,481 A | * | 8/1994 | Tsukamoto ................. | 710/107 |
| 5,371,736 A | * | 12/1994 | Evan .......................... | 370/470 |
| 5,481,696 A | * | 1/1996 | Lomp et al. ................. | 710/8 |
| 5,581,741 A | * | 12/1996 | Clark et al. ................. | 395/500 |
| 5,613,078 A | * | 3/1997 | Kishigami ................... | 710/126 |
| 5,636,348 A | * | 6/1997 | Buxton et al. ............... | 710/105 |
| 5,671,355 A | * | 9/1997 | Collins ....................... | 709/250 |
| 5,805,931 A | * | 9/1998 | Morzano et al. ............ | 710/64 |
| 5,832,244 A | * | 11/1998 | Jolley et al. ................ | 710/129 |
| 5,842,045 A | * | 11/1998 | Nakamura .................. | 710/127 |
| 5,909,596 A | * | 6/1999 | Mizuta ........................ | 710/63 |
| 5,911,053 A | * | 6/1999 | Pawlowski et al. ......... | 710/127 |
| 5,920,731 A | * | 7/1999 | Pletl ........................... | 710/14 |
| 5,996,032 A | * | 11/1999 | Baker ......................... | 710/62 |
| 6,038,400 A | * | 3/2000 | Bell et al. ................... | 395/831 |
| 6,016,517 A | * | 6/2000 | Capps, Jr. et al. ........... | 710/1 |
| 6,101,565 A | * | 8/2000 | Nishtala et al. ............. | 710/127 |
| 6,101,567 A | * | 8/2000 | Kim et al. ................... | 710/129 |
| 6,185,629 B1 | * | 2/2001 | Simpson et al. ............. | 710/10 |

OTHER PUBLICATIONS

Al Chamé, "Applications Information Interfacing the 68360 (QUICC) to T1/E1 Systems," Motorola Semi–conductor Technical Information, http://www.mot.com/netcom/docs/pubs/360toT1.html, Dec. 4, 1996.

"Communications Processor Module (CPM)," Motorola MC68360 Quad Integrated Communications Controller User's Manual, rev. 1, ch. 7, Dec. 4, 1996, pp. 7–1–7–381.

* cited by examiner

Primary Examiner—Jeffrey Gaffin
Assistant Examiner—Abdelmoniem Elamin
(74) Attorney, Agent, or Firm—Thomas, Kayden, Horstemeyer & Risley

(57) ABSTRACT

The present invention entails a programmable data communications protocol conversion unit (PCU) and method. The PCU is a processor circuit which includes a means for performing full parallel, partial parallel, and bit data transfers. In particular, a bit assembly register is employed to assemble partial parallel data blocks which comprise data with a number of bits that is less than the order of the data bus of the PCU. The bit assembly register further includes the capability of writing the partial parallel data block to predetermined locations using a full parallel transfer and a shadow bus with bits indicating the validity of the particular bits in the data block transferred. The particular circuits receiving partial parallel writes include a register for receiving data and a register for receiving the corresponding shadow bits. Invalid data written to these registers is ignored while valid data is shifted accordingly, for example, out to a serial interface. The PCU further includes a task specific circuit for performing bit alignment and other tasks and a task specific circuit for generating cyclic redundancy check (CRC) data. The later circuit can create CRC data for any number of protocols as the circuit is highly configurable with a bit shift register of varying lengths.

19 Claims, 8 Drawing Sheets

SYSTEM AND METHOD FOR PROTOCOL CONVERSION IN A COMMUNICATIONS SYSTEM

CROSS REFERENCE TO RELATED APPLICATIONS

This application claims the benefit of United States provisional patent application entitled "Programmable Framer for HDSL Transmissions" filed on Oct. 1, 1997 and afforded Ser. No. 60/060,651, the entire text of which is incorporated herein by reference.

STATEMENT REGARDING FEDERALLY SPONSORED RESEARCH OR DEVELOPMENT

Not Applicable.

TECHNICAL FIELD

The present invention relates to the field of data communications, and more particularly, to the field of framing data in a communications system.

BACKGROUND INFORMATION

In data communications, data is generally transmitted in a serial communications format through current networks. It is often the case that the data to be transmitted between two data endpoints is packaged according to specific data communications protocols to facilitate the transmission across the particular network in question. This packaging may include the addition of network management and other information such as as headers and trailers to the data to facilitate transmission based upon the dictates of the particular protocol employed. Such packaging is generally termed "framing" in the art.

Some of these protocols may include, for example, data transmission using time division multiplexing (TDM) approaches such T1 and E1 standards known in the art. Other example standards may include high-level data link control (HDLC) or asynchronous transfer mode (ATM). Each of these protocols have their own applications and goals in terms of history, performance, error-immunity, flexibility, and other factors. Consequently, each of these protocols employ framing procedures by which data is packaged for transmission across the various networks employed. These protocols are generally incompatible and require translation or conversion to transmit data in a transmission link that employs two or more protocols in two or more different segments.

The conversion from one protocol to another requires specific framing technology to accomplish the task. With a myriad of standards between which conversion is possible, many different dedicated protocol conversion units have been developed to accomplish the specific conversion tasks presented. The typical protocol conversion unit is labeled "dedicated" above because such units generally employ dedicated circuits which are capable only of performing the conversion from one specific protocol to another. The result of this fact is a multitude of protocol conversion units on the market to accomplish the individual conversion tasks, thereby diminishing efficiencies to be obtained by mass production.

It is also the case that new communications standards are developed as data communication technology develops over time. Often times, a particular standard may be in flux while discussion ensues among those skilled in the art until agreement on concrete provisions articulating a standard is reached. Consequently, it is difficult to develop data communications technology that employs an up and coming standard until the standard is settled. In the competitive world of data communications technology production, it is desirable to produce products to meet these new standards as quickly as is possible after a standard is finalized so as to compete in the marketplace.

BRIEF SUMMARY OF THE INVENTION

An objective of the present invention is to provide for a data communications protocol conversion unit which can achieve protocol conversions between any number of protocols to obtain the efficiencies of mass production and feature the flexibility allowing the unit to be quickly adapted to new data communications protocols as they develop.

In furtherance of this and other objectives, the present invention entails a programmable data communications protocol conversion unit (PCU) according to embodiments of the present invention. The PCU is a processor circuit which includes a means for performing full parallel, partial parallel, and bit data transfers. In particular, a bit assembly register is employed to assemble partial parallel data blocks which comprise data with a number of bits that is equal to or less than the order of the data bus of the PCU. The bit assembly register further includes the capability of writing the partial parallel data block to predetermined locations using a full parallel transfer and a shadow bus with bits indicating the validity of the particular bits in the data block transferred. The particular circuits receiving partial parallel writes include a register for receiving data and a register for receiving the corresponding shadow bits. Invalid data, that is, data with the associated shadow bit set to zero, that is written to these registers is ignored while valid data is shifted accordingly, for example, out to a serial interface.

The PCU further includes a task specific circuit for performing bit alignment and other tasks and a task specific circuit for generating cyclic redundancy check (CRC) data. The later circuit can create CRC data for any number of protocols as the circuit is highly configurable with a bit shift register of varying lengths.

In accordance with another aspect of the present invention, a method is provided for processing data in a processor unit, comprising the steps of performing a bit write operation allowing the processor to write a single predefined data bit to a target register, and performing a partial parallel data transfer allowing the processor to transfer a predefined partial parallel data value to a target register. The step of performing the bit write operation further comprises the step of coupling an instruction decoder to a plurality of input registers with a bit bus, the input registers being associated with a plurality of logical circuits. The method may also include the steps of translating a full parallel data transfer into a partial parallel data transfer, transferring the partial parallel data to the target register, and indicating the validity of data bits in the partial parallel data.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
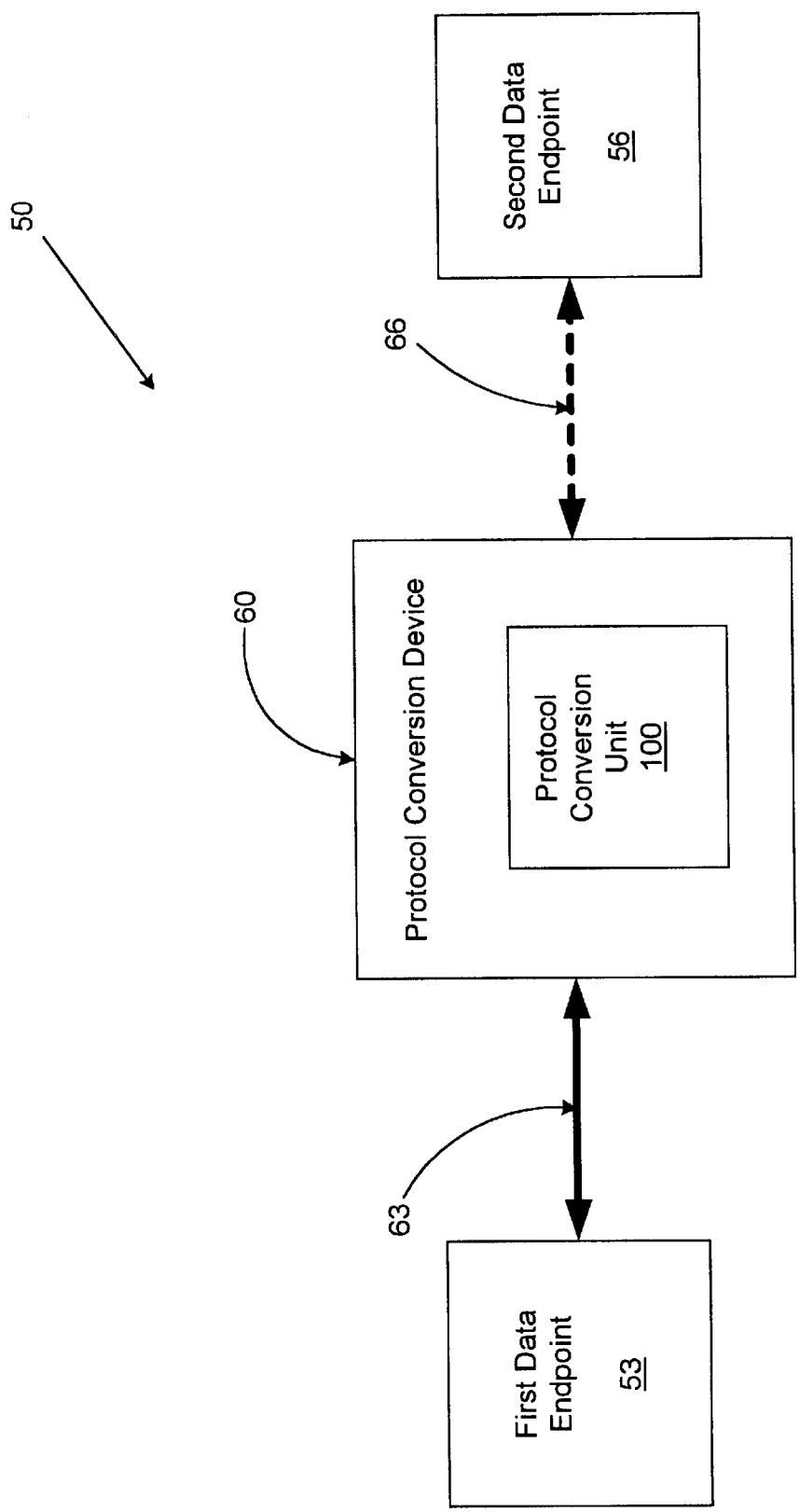
FIG. 1 is a block diagram of a data communications system according to an embodiment of the present invention.

Turning to FIG. 1, shown is a communications system 50 according to the present invention. The communications system 50 includes a first data endpoint 53 and a second data endpoint 56. The first and second data endpoints 53 and 56 may be, for example, a modem, data terminal equipment or apparatus. The first and second data endpoints 53 and 56 establish data communications with each other through the protocol conversion device 60 via a bi-directional data stream. However, the first data endpoint 53 communicates the data stream using a first data communications protocol 63, and the second data endpoint 56 communicates the data stream using a second data communications protocol 66, where the first and second data communications protocols are incompatible.

The protocol conversion device 60 includes a protocol conversion unit 100 which converts the data stream from the first data communications protocol 63 to the second data communications protocol 66 and vice versa. The protocol conversion unit 100 is programmable to perform the conversions as discussed herein.

The first and second data communications protocols 63 and 66 may be, for example, any one of those outlined in the following standards of the International Telecommunication Union (ITU), formerly the International Telegraph and Telephone Consultative Committee (CCITT), and other listed organizations, as listed in table 1 below.

TABLE 1

| popular name | Standard document | Title (and relevant chapter) of the standardization document |
|---|---|---|
| T1 | ITU-T G.704, § 2.1 | ITU General aspects of digital transmission systems; Terminal equipments Synchronous frame structures used at primary and secondary hierarchical levels |

TABLE 1-continued

| popular name | Standard document | Title (and relevant chapter) of the standardization document |
|---|---|---|
| | | Protocol for basic frame structure at 1544 kbit/s Recommendation G.704, Geneva 1991 |
| T2 | ITU-T G.704, § 2.2 | ITU General aspects of digital transmission systems; Terminal equipments Synchronous frame structures used at primary and secondary hierarchical levels Protocol for basic frame structure at 6312 kbit/s Recommendation G.704, Geneva 1991 |
| E1 | ITU-T G.704, § 2.3 | ITU General aspects of digital transmission systems; Terminal equipments Synchronous frame structures used at primary and secondary hierarchical levels Protocol for basic frame structure at 2048 kbit/s Recommendation G.704, Geneva 1991 |
| E2 | ITU-T G.704, § 2.4 | ITU General aspects of digital transmission systems; Terminal equipments Synchronous frame structures used at primary and secondary hierarchical levels Protocol for basic frame structure at 8448 kbit/s Recommendation G.704, Geneva 1991 |
| HDSL E1 | ETSI ETR 152 | European Telecommunication Standard Institute (ETSI), Transmission and Multiplexing; High bit rate Digital Subscriber Line (HDSL) transmission system on metallic local lines; RDSL core specification and applications for 2048 kbit/s based access digital sections. HDSL core specification and applications for 2048 kbit/s based access digital sections. December 1996 |
| RADSL | T1E1/97-104R2a CAP/QAM RADSL | Draft American National Standards for Telecommunication Rate Adaptive Asymmetric Digital Subscriber Line (RADSL) Metallic Interface Draft Physical Layer Specification for CAP/QAM Based Rate Adaptive Digital Subscriber Line (RADSL), October 15, 1997 |
| ATM Utopia | ATM Forum UTOPIA, Level 1 | ATM Forum Technical Committee UTOPIA, An ATM-PHY Interface Specification Level 1, Version 2.01, March 1994 |
| ATM Utopia | ATM Forum UTOPIA, Level 2 | ATM Forum Technical Committee UTOPIA, An ATM-PHY Interface Specification Level 2, Version 1.0, June 1995 |
| DMT | T1.E413 | Draft American National Standards for Telecommunication Standards Project for Interfaces Relating to Carrier to Customer Connection of Asymmetrical Digital Subscriber Line (ADSL) Equipment T1.413, Issue 2, June 1998 |

However, it is understood that the above list is not exhaustive, as the protocol conversion unit 100 may convert other data communications protocols not listed above, the above list being exemplary.

Figure 2:
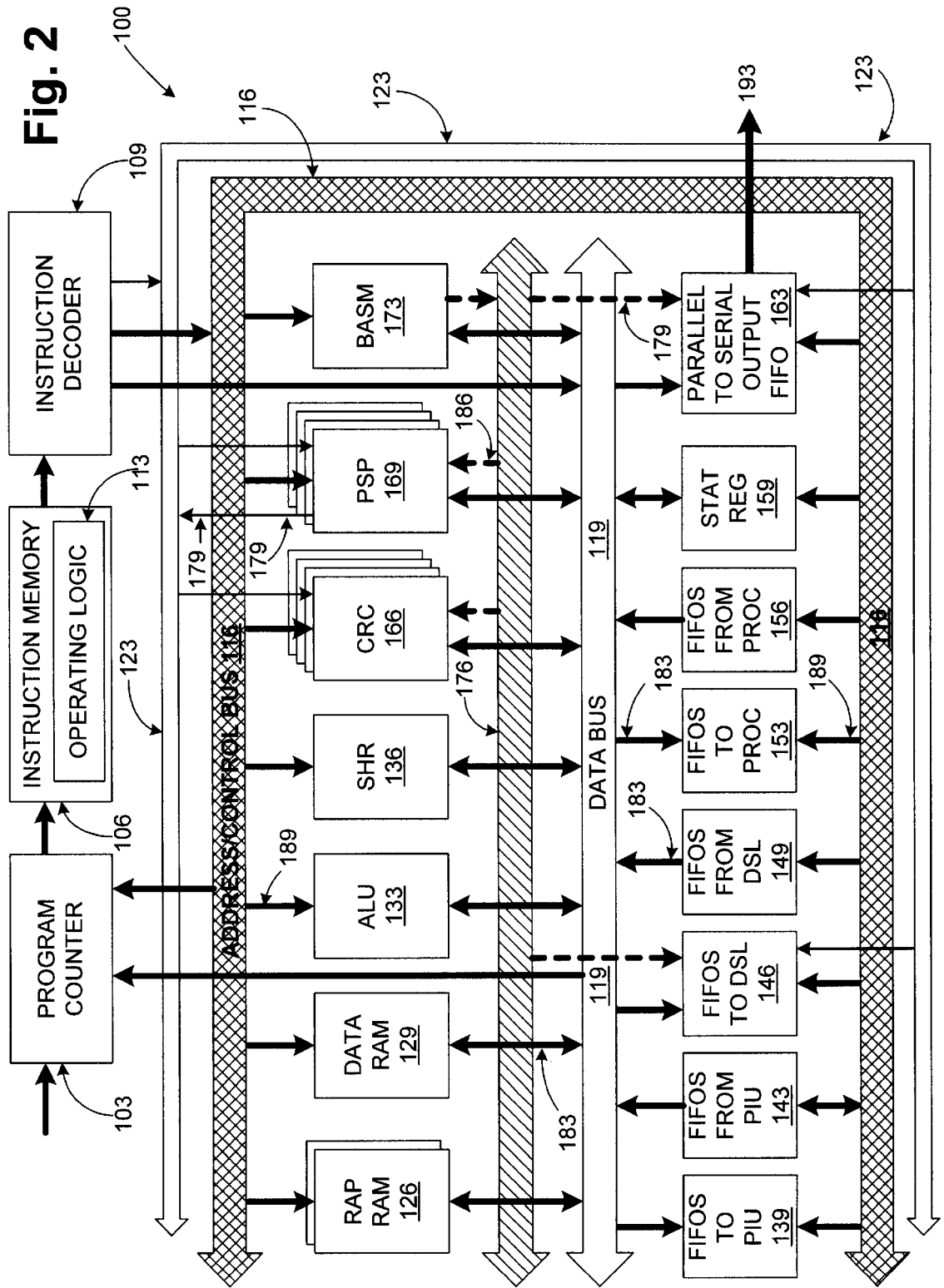
FIG. 2 is a block diagram of the protocol conversion unit according to an embodiment of the present invention.

Turning then FIG. 2, shown is the protocol conversion unit 100 according to the present invention. First the protocol conversion unit 100 will be described followed by a description of its functionality. The protocol conversion unit 100 includes a program counter 103 electrically coupled to an instruction memory 106 which, in turn, is electrically coupled to an instruction decoder 109. Stored in the instruction memory 106 is operation logic 113. The program counter 103 is electrically coupled to an address/control bus 116 and a data bus 119, thereby allowing data to be read into the program counter 103 from the address/control bus 116 and the data bus 119. The instruction decoder 109 is also electrically coupled to the address/control bus 116 and the data bus 119 thereby allowing data to be written from the instruction decoder 109 to the address/control bus 116 and the data bus 119. The data bus 119 is comprised of eight parallel conductors and the address/control bus 116 is comprised of individual read and write conductors for each register of the protocol conversion unit 100.

The protocol conversion unit 100 also includes a bit bus 123 which is comprised of two conductors. Although shown separately in FIG. 5 for clarity, in the preferred embodiment the two conductors of the bit bus 123 are actually included with the address/control bus 116. The instruction decoder 109 is electrically coupled to the bit bus 123.

The address/control bus 116, data bus 119, and the bit bus 123 are electrically coupled to the various data handling blocks which include various task specific logical circuits within the protocol conversion unit 100. Generally the data handling blocks all read control and address data from the address/control bus 116 and can both read and write data to the data bus 119, although some of the data handling blocks can perform either read only or write only to the data bus 119, depending upon the function of the particular data block. The data handling blocks include an random access pointer (RAP) random access memory (RAM) 126 used in reading or writing data based on addresses that are evaluated at the execution time of the operational logic and are not hard-coded in the operational logic, a data RAM 129 also known as a scratch RAM, an arithmetic logic unit (ALU) 133, and a shift register 136. Note that there can be more than only one RAP RAM 126 as shown by the layered appearance in FIG. 2.

The data handling blocks also include a number of first in, first out registers (FIFO's) to facilitate the reception and transmission of data. Specifically, the FIFO's include a physical interface unit (PIU) output FIFO 139, a CIU input FIFO 143, a digital subscriber line (DSL) output FIFO 146, a DSL input FIFO 149, a general purpose processor output FIFO 153, and a general purpose processor input FIFO 156. The data handling blocks further include a status register 159 and a parallel-to-serial output FIFO 163.

The protocol conversion unit (PCU) 100 also features task specific logical circuits which include a cyclic redundancy check (CRC) generator 166, a parallel-to-serial-to-parallel (PSP) converter 169, and a bit-assembly (BASM) circuit 173. Both the CRC generator 166 and the PSP circuit 169 are represented by four layers which show four redundant circuits. The PCU 100 further comprises a shadow bus 176 which interfaces with predefined data handling blocks as will be discussed.

Specific data handling blocks are electrically coupled to the bit bus 123, the address/control bus 116, the data bus 119, and the shadow bus 176 in order to execute bit transfers 179, full parallel transfers 183, or shadow transfers 186. Note control/address information 189 is transmitted to each data handling block as shown. The parallel-to serial output FIFO also includes a serial output 193.

Figure 3:
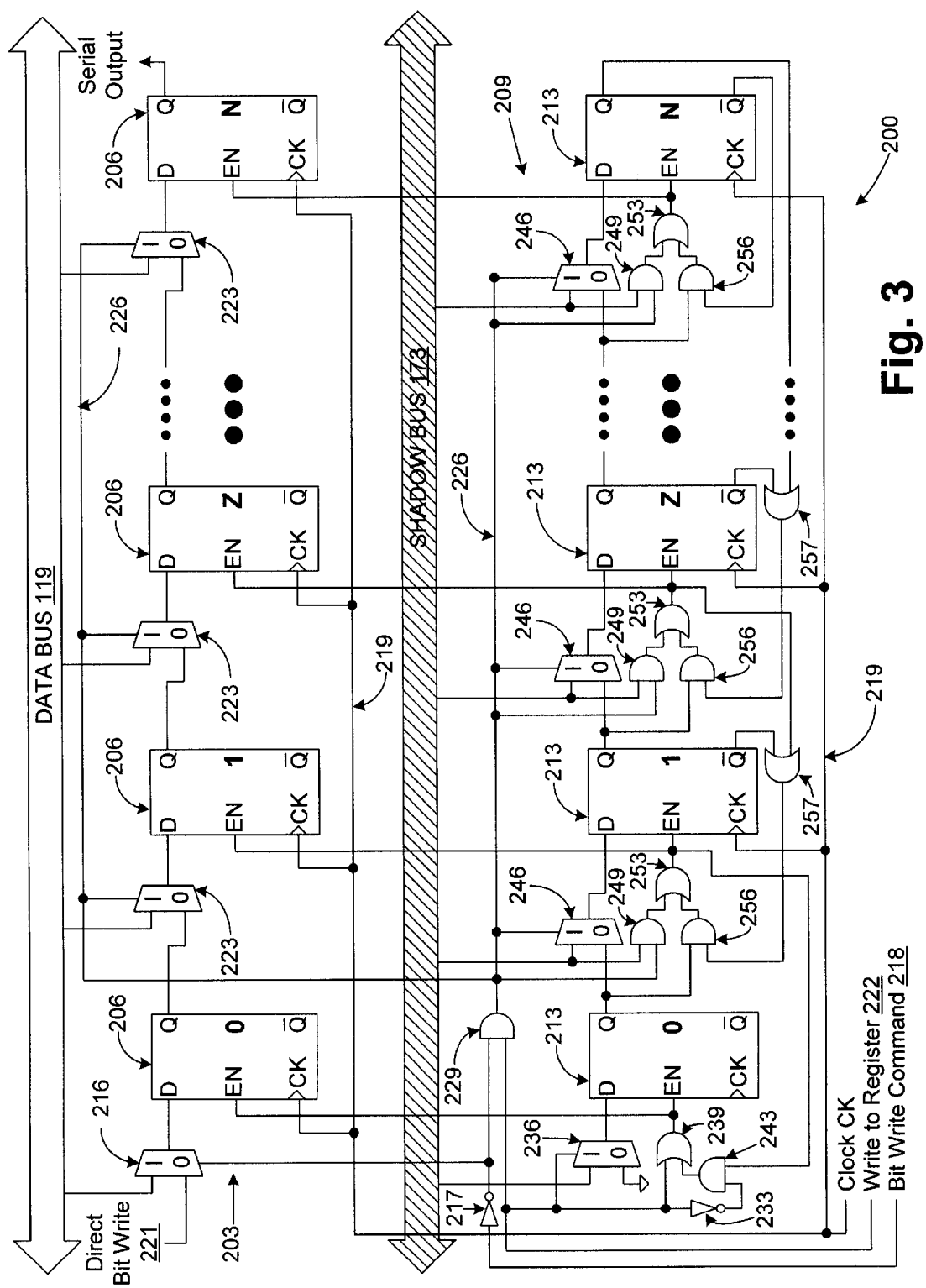
FIG. 3 is a schematic of a parallel-to-serial circuit employed in the protocol conversion unit of FIG. 2.

Turning to FIG. 3, shown is a FIFO register circuit 200 employed by several data handling blocks in the protocol conversion unit 100. The FIFO register circuit 200 includes a data register 203 which is comprised of a number of data register positions 206 and a shadow register 209 with an equal number of shadow register positions 213. For purposes of this discussion, the data register positions 206 and the shadow register positions 213 are numbered from 0 to N as shown. In the preferred embodiment, there are eight actual data and shadow register positions 206 and 213, where N=7, however, any number of register positions may be employed. The data register positions 206 and shadow register positions 209 are actually comprised of, for example, positive level static D flip-flops, however, it is understood that other circuit components may be employed in the place of the D flip-flops which will perform the functions of the D flip-flops as shown herein.

Referring first to the data register 203, the input D of the D flip-flop which comprises the $0^{th}$ register position 206 (hereafter "the $0^{th}$ D flip-flop") is coupled to an output of a bit write multiplexer 216. The bit write multiplexer 216 includes a first input coupled to the data bus 119 and a second input coupled to the bit bus 115 (FIG. 1), through which a direct bit write signal 221 is received. The bit write multiplexer 216 also includes a control input which is coupled to the bit bus 115 through a first NOT gate 217, which is triggered by a bit write command 218 from the bit bus 115. The enable input EN of the $0^{th}$ D flip-flop is coupled to the enable input EN of a corresponding D flip-flop comprising the $0^{th}$ register position 213 of the shadow register 209. Note that the enable inputs EN of all D flips flops in corresponding register positions 206 and 213 are coupled together, respectively.

The clock input CK of the $0^{th}$ D flip-flop is coupled to a common clock line 219 which is coupled to the clock inputs CK of all the D flip-flops in the data register 203 and the shadow register 209. The output Q of the $0^{th}$ D flip-flop is coupled to a first input of a data/shift multiplexer 223. The second input of the data/shift multiplexer 219 is coupled to the data bus 119. Additional data/shift multiplexers 219 are similarly coupled between the subsequent D flip flops that comprise the data register positions 206 as shown. Each data/shift multiplexer 219 includes a control input to toggle between the first and second inputs, the control inputs being coupled to a write control line 226. The output Q of the D flip flop at the final $N^{th}$ data register position 206 serves as a serial output of the data register 203 and is coupled to appropriate circuitry.

The write control line 226 is coupled to the output of a write AND gate 229. The write AND gate 229 has a first input coupled to the output of the first NOT gate 217 and a second input coupled to an address/control bus (not shown) through which a "write to register" command 222 is received. The same write to register command 222 from the address/control bus is coupled to the input of a second NOT gate 233, a control input of a $0^{th}$ shadow multiplexer 236, and a first input of an initial OR gate 239. The output of the second NOT gate 233 is coupled to a first input of an initial shift AND gate 243. The output of the initial shift AND gate 243 is coupled to an input of the initial OR gate 239. The output of the initial OR gate 239 is coupled to the enable inputs of the D flip-flips in the $0^{th}$ data register position 206 and the $0^{th}$ shadow register position 213. The $0^{th}$ shadow multiplexer 236 has a first input coupled to the shadow bus 176, and a second input coupled to ground which acts as a logical "0"The output of the $0^{th}$ shadow multiplexer 236 is coupled to the input D of the $0^{th}$ D flip-flop.

The first and second NOT gates 217 and 233, $0^{th}$ shadow multiplexer, initial shift AND gate 243, the write AND gate 229, and the initial OR gate 239 comprise a front end circuit before the $0^{th}$ shadow register position 213. Thereafter, a common circuit is employed between the remaining register positions 213 which facilitates the use of both the data register 203 and the shadow register 209 to write data to, and to shift the data.

This common circuit includes a write/shift multiplexer 246, a write enable AND gate 249, an enable OR gate 253, a shift enable AND gate 256, and a shift OR gate 257. The write/shift multiplexer 246 includes a control input which is coupled to the write control line 226, a first input which is coupled to the shadow bus 176, and a second input coupled to the output Q of the previous D flip-flop. The write enable AND gate 249 has a first input coupled to the shadow bus 176, a second input coupled to the write control line 226 and an output coupled to an input of the enable OR gate 253. The shift enable AND gate 256 has a first input coupled to an output of the shift OR gate 257, a second input coupled to the output Q of the previous D flip-flop, and an output coupled to a second input of the enable OR gate 253. The shift OR gate 257 has a first input coupled to the inverted output $\overline{Q}$ of the current D flip-flop as shown, and a second input coupled to the output of the enable OR gate 253 which is coupled to the enable input of the following D flip-flop as shown.

Next the operation of the FIFO register circuit 200 is discussed. The above circuit facilitates either a full parallel write, a partial parallel write, and a single bit write to the data register 203. In all cases, each bit in the data register 203 which comprises valid data receives a logical "1" in the corresponding shadow register position 213. Only those bits in the data register 203 with a logical "1" in their corresponding shadow register position 213 are shifted to the serial output of the FIFO register circuit 200. Both the bits in the data register 203 and corresponding bits in the shadow register 209 are shifted simultaneously.

In the case of a full parallel write to all of the data register positions 119 from the data bus 119, a corresponding full parallel write to the shadow register positions 213 is executed from the shadow bus 176. With a full parallel write, all of the shadow register positions 213 will receive a logical "1" from the shadow bus 176, where a logical "1" is placed on all conductors of the shadow bus 176 unless a partial parallel write is performed.

During a partial parallel write, a full parallel write is performed to the data register positions 206 from the data bus 119 and a full parallel write is performed to the shadow register positions 213 from the shadow bus 176. However, in a partial parallel write, at least one of the data bits written from the shadow register will be a logical "0" which indicates that the corresponding bit in the data register 203 is invalid. In such a case, only valid bits which are part of the partial parallel write are shifted to the serial output of the data register 203.

Finally, a bit write is performed to the left-most data register position 206 and corresponding shadow bit is written to the left-most shadow register position 213 from the bit bus 115. Thereafter, both the data bit and the shadow bit are shifted across the data and shadow register positions until the bit is supplied to the serial output.

First the operation of a bit write is discussed in detail. When a bit write is to be performed, the bit write command is set to a logical "1" or set "high", which causes a low output at the first NOT gate 217 which, in turn, causes the bit write multiplexer 216 to couple the bit write conductor of the bit bus 115 to the input of the $0^{th}$ D flip-flop. In addition, the output of the write AND gate 229 is a logical "0", or is "low" which places the remainder data register positions 206 and shadow register positions 213 in a shift mode where the data/shift multiplexers 223 and the write/shift multiplexers 246 are set to cause the outputs Q of the D flip-flops to be fed into the inputs D of the adjacent D flip-flops as shown. The "write to register" command is set high, resulting in a high output at the initial OR gate 239 which enables the $0^{th}$ D flip-flop, and, a high control signal is applied to the $0^{th}$ shadow multiplexer 236 which applies a shadow bit from the shadow bus 176 to the first shadow register 213 (the $0^{th}$ D flip-flop). Although a logical "1" is placed on all the remaining conductors of the shadow bus 176, only the shadow bit from the first shadow register 213 is enabled to receive the logical "1".

In an alternative explanation of a bit write operation, the leftmost register positions bit of the data and shadow registers 206 and 213 may operation in one of two modes. In the case where a Bit Write Command 222 is transmitted, a single data bit from the bit bus 115 is applied through the bit write multiplexer 216 to the leftmost register position 206. At the same time bit seven of the shadow bus 176 is applied through the $0^{th}$ shadow multiplexer 236 to the leftmost register of the shadow register 209. Both leftmost register positions 206 and 213 are enabled through the "Write-to-Register" signal through the initial OR gate 239, so that on the next rising edge of the clock signal 219, the applied data and shadow bits are written into the leftmost registers. At the same time, the Bit Write Command 222 signal, inverted by the first NOT gate 217 inhibits the write AND gate 229 so that only one single bit is loaded into the leftmost register position 206, and only one single data bit is loaded into the leftmost shadow register position 213. As all bits of the shadow bus 176 are always set to a logical "1" at all times unless a partial bit write is performed.

The shifting function of the shadow register 209 and the data register 203 will cause the valid data bits and corresponding shadow bits written to the data and shadow registers 203 and 209, respectively, to shift to the right (as seen in FIG. 2), until the valid data bits are supplied to the serial output. In particular, after valid data bits are written to any one of the data register positions 206 with shadow bits written to corresponding shadow register positions 213 in a full parallel, partial parallel, or bit write, the "write to register" command is set low. This causes the data/shift multiplexers 223 and the write/shift multiplexers 246 to apply the preceding D flip-flop output Q to the input D of the D flip-flop coupled to the output of the respective data/shift or write/shift multiplexer 223 or 246. In this situation, the data and shadow registers 203 and 209 are said to be in a shift mode. The following discussion is with reference to the D flip-flops in the shadow register positions 213 labeled 1, 2, and N.

Assuming that the data and shadow registers 203 and 209 are in the shift mode, when a shadow bit held by a D flip-flop 2 of the shadow register 209 is a logical "0", then the inverted output $\overline{Q}$ of D flip-flop 2 is set high. Consequently, the output of the shift OR gate 253 coupled to the inverted output $\overline{Q}$ is set high. If the shadow bit held by the preceding D flip-flop 1 holds a logical "1", then the shift enable AND gate 256 is set high, which results in a high output at the enable OR gate 253 and the logical "1" is shifted from the preceding D flip-flop 1 in to the enabled D flip-flop 2.

If while in the shift mode, the shadow bit held by D flip-flop 2 holds a logical "1", the inverted output $\overline{Q}$ of the D flip-flop 2 is set low. When the subsequent D flip-flop N is enabled, the output of the shift OR gate 257 attached to the enable input of D flip-flop N is set high. At the same time, when a logical "1" is seen at the output Q of the preceding D flip-flop 1, then the shift enable AND gate 257 receiving the output Q from the D flip-flop 1 is set high, which sets the enable OR gate 253 coupled to the enable input EN of the D flip-flop 2 high, shifting the shadow bit from D flip-flop 1 to 2, and from D flip-flop 2 to N.

To summarize the above statements, a shadow register position is empty if it holds a logical "0", and is full if it holds a logical "1". A full shadow register position 213 will only receive data shifted from the left when it can shift its shadow bit to the right. However, an empty shadow register position 213 will always receive data to be shifted from the left, but will not shift its logical "0" to the right. Thus, after a bit or a number of bits are written to the data register 203 and the FIFO register circuit 200 transitions from a write mode to a shift mode where the data bits will automatically shift to the right if the adjacent shadow register position 213 to the right is empty, or if the same shadow register position 213 is full and is shifting to the right as well. For the purposes of this application, this automatic shifting nature of the FIFO register circuit 200 is termed a trickle effect. Note that the data bits in the data register 203 are shifted simultaneously along with the shadow bits in the shadow register 209 which maintains a serial data stream at the serial output.

In the cases of a partial parallel and a full parallel write, the "Write to Register" command is set high which causes the initial shadow multiplexer 236, the write/shift multiplexers 246, and the data/shift multiplexers 223 to apply the values on the data bus 119 and the shadow bus 176 to be applied to the inputs of the register positions 206 and the shadow register positions 213. Also, the bit write multiplexer 216 applies the value on the data bus 119 to the input of the leftmost register position 206. Simultaneously, the different bits of the shadow bus 176 together with the decoded "Write to Register" command enable any shadow register position 213 via the write enable AND gates 249 and the enable OR gates 253 where the respective shadow bit is set to a logical "1". In the case of a full parallel write, all of the bits on the shadow bus 176 are set to a logical "1" and all the data bits written to shadow register positions 213 and their corresponding data register positions 206 are shifted to the right as discussed previously.

In the case of a partial parallel write, one or more of the shadow bits on the shadow bus 176 may be set to a logical "0" which results in the corresponding shadow register position 213 and its companion data register position 206 staying in a disabled state. In this case, the disabled shadow register position 213 and its corresponding disabled data register position 206 retain their original values. Thus, after a partial parallel write is executed, only the data bits in the data register positions 206 with a logical "1" in the corresponding shadow register position 213 will be shifted to the right as was discussed above.

Figure 4A:
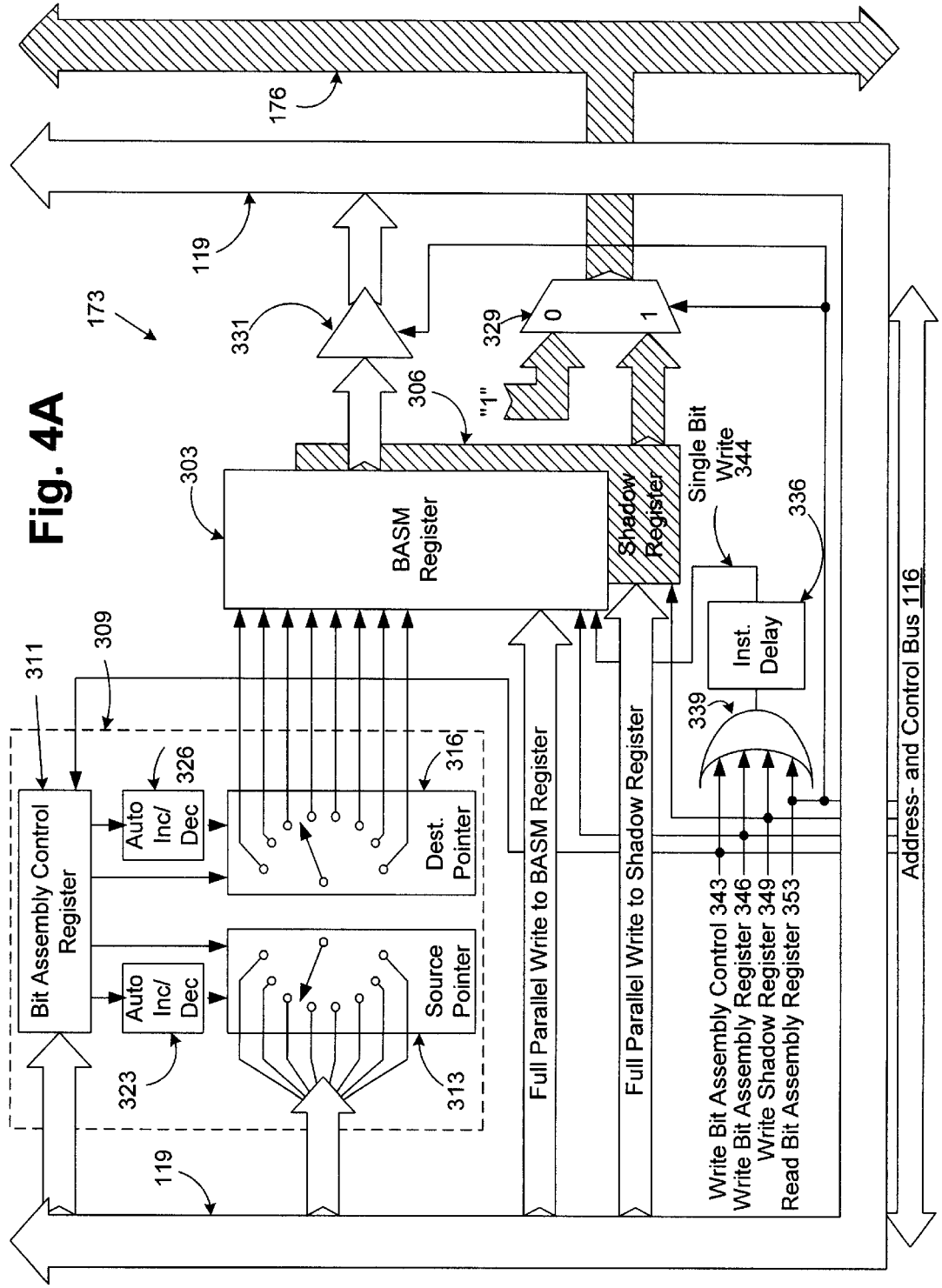
FIG. 4A is a block diagram of a bit assembly circuit employed by the protocol conversion unit of FIG. 2.

Turning to FIG. 4A, shown is a bit assembly circuit 173 according to an embodiment of the present invention. The bit assembly circuit 173 is advantageously designed to perform partial parallel data transfer on the data bus 119 to facilitate a conversion between two predetermined data communications protocols. The bit assembly circuit 173 is further described in the U.S. patent application, entitled. Circuit And Method For Performing Partial Parallel Data Transfer In A Communications System, filed on even data herewith and assigned Ser. No. 09/164,850, the entire text of which is incorporated herein by reference.

The bit assembly circuit 173 comprises a bit assembly register 303 with a corresponding shadow register 306 and a bit routing circuit 309. The bit routing circuit 309 includes a bit assembly control register 311 which is electrically coupled to a source pointer 313 and a destination pointer 316. Both the source pointer 313 and the bit assembly control register 311 are electrically coupled to a data bus 119. The source and destination pointers 313 and 316 are electrically coupled to the bit assembly control register 311 both directly and through a source increment/decrement circuit 323 and a destination increment/decrement circuit 326, respectively.

Note that the bit assembly register 303 includes a predetermined number of register positions for storing a data block. The register positions may comprise a single D flip-flop or other component with similar capabilities. In the preferred embodiment, the predetermined number of register positions is equal to the parallel bit handling capacity of the data bus 119. In the preferred embodiment of the present invention, there are eight register positions to accommodate a single byte of data. The shadow register 306 includes a number of register positions equal to the number of register positions of the bit assembly register 303.

Both the bit assembly register 303 and the shadow register 306 are electrically coupled to the data bus 119 to facilitate full parallel writes, i.e. a data bit is written on each conductor of the data bus 119, via the data bus 119. A full parallel write is one which uses the entire width of the data bus 119 where each conductor contains a data bit. The data content of the bit assembly register 303 may also be read from the bit assembly register 303 through the data bus 119. The bit assembly control register 311, source pointer 313, bit assembly register 303, and the shadow register 306 each have individual addresses by which these components are enabled via a address/control bus in an overall processor circuit of which the bit assembly circuit 173 is a part.

The bit assembly circuit 173 further comprises a shadow multiplexer 329 with a first input coupled to the output of the shadow register 306 and a second input coupled to a logical "1", The output of the shadow multiplexer 329 is electrically coupled to a shadow bus 176. Note that the shadow multiplexer 329 couples either the "valid" data bits of the shadow register 306 or a number of logical "1s" to the conductors of the shadow register 306. Also note that the output of the bit assembly register 303 is coupled to the data bus 119 via an output driver 331.

The bit assembly circuit 173 further includes an instruction delay 336 which has an input coupled to a trigger OR gate 339. The output of the instruction delay 336 is a single bit write signal 344. The trigger OR gate 339 includes four inputs, each input receiving one of a write bit assembly control signal 343, a write bit assembly register signal 346, a write shadow register signal 349, and a read bit assembly register 353. The write bit assembly control signal 343, write bit assembly register signal 346, write shadow register 349, and read bit assembly register 353 are received via a control and address bus 116.

Next the operation of the bit assembly circuit 173 is explained. The operation of the bit assembly circuit 173 can be explained in the context of two separate stages. First, is a partial parallel data block assembly stage and, second, is a partial parallel write stage.

Starting with the partial parallel data block assembly stage, the bit routing circuit 309 is employed to write any single bit from the data bus 119 to any register position in the bit assembly register 303. A full parallel write is performed to the bit assembly control register 311 through the data bus 119 which indicates the particular data bit of the data bus 119 to be routed, as well as the particular register position of the bit assembly register 303 to receive the routed data bit. Data from the data bus 119 is written to the bit assembly control register 311 when the write bit assembly control signal 343 is a logical "1".

The bit assembly control register 311 triggers the source increment/decrement circuit 323 to cause the source pointer 313 to access a particular bit on the data bus 119. The bit assembly control register 311 further triggers the destination increment/decrement circuit 326 to cause the destination pointer 316 to route the bit received from the source pointer 313 to a particular register position in the bit assembly register 303. The source pointer 313 and the destination pointer 316 both are shown as a switching device which represents a solid state switching circuit to accomplish the routing task.

To perform a bit write to the bit assembly register 303, a data value is placed onto the data bus 119 and the write bit assembly control 343 is set to a logical "1" and the data is written to the bit assembly control register 311. At the same time, the write bit assembly control signal 343 also "primes" the instruction delay so that the single bit write signal 344 is a logical "1" on the next instruction.

Anytime the single bit write signal 344 is a logical "1", any register write to the bit assembly register 303 is routed through the bit routing circuit 309. When the single bit write signal 344 is a logical "0", any write to the bit assembly register 303 is a full parallel write. Thus, in order to perform a bit write to the bit assembly register 303, the instruction delay is "primed" by a prior instruction which can be one of the write bit assembly control signal 343, write bit assembly register signal 346, write shadow register 349, or the read bit assembly register 353.

Thus after the single bit write signal 344 is primed by write that occurred to the bit assembly control register 311 (due to the write bit assembly control signal 343), a data value containing the particular bit to be read to the bit assembly register is written to the data bus 119. Thereafter, the write bit assembly register signal 346 is set to a logical "1" and the particular data bit is written from the data bus 119 to the particular bit position of the bit assembly register 303 via the bit routing circuit 309.

In this manner, the predetermined bits are read to the desired register positions of the bit assembly register 303 via the bit routing circuit 309. With each bit placed in the bit assembly register 303, a logical "1" read to the corresponding register position of the shadow register 306 to indicate that the data bit written is valid.

In addition, a full parallel write may be executed to the bit assembly register 303 through the data bus 119. In such a case, a full parallel write is performed to the bit assembly register 303 without priming the instruction delay 336. This is accomplished by simply placing the full parallel write onto the data bus 119 and then setting the write bit assembly register 346 to a logical "1". In this case, the parallel write is made before the single bit write signal 344 is set to a logical "1". The fact that the single bit write signal is set to a logical "1" thereafter is of little consequence since the full parallel write has already occurred and it is unlikely that a single bit write to the bit assembly register 303 will be made immediately thereafter. Corresponding bits are written to the shadow register 306 when the full parallel write is made to the bit assembly register 303.

The instruction delay 336 may also be primed by a full parallel write to the shadow register 349 as shown. Such a write is perform in the same manner as a full parallel write to the bit assembly register 303 as described above. This allows one to bypass the automatic shadow bit setting operations of the bit assembly register 303 every time it receives bitwise or full parallel data. Note that the bit assembly register 303 may be cleared by a full parallel write of logical "0s" to the shadow register 306 indicating that all bit assembly register positions hold invalid data.

Note that both the source increment/decrement circuit 323 and destination increment/decrement circuit 326 may be set to automatically cycle the source pointer 313 and the destination pointer 316 to the next position for each subsequent bit write, or the source increment/decrement circuit 323 and destination increment/decrement circuit 326 can be bypassed altogether and the source pointer 313 and the destination pointer 316 receive position data directly from the bit assembly control register 311, depending upon the precise instruction written to the bit assembly control register 311.

Once the bit assembly register 303 receives the complete partial parallel data block with which to perform a partial parallel write, then the second stage of the bit assembly circuit operation is performed in which a partial parallel write is performed. This includes a partial parallel bit read from the bit assembly register 303 which is ultimately written to a target destination register (not shown) in the overall processor circuit which also includes a shadow register to indicate valid data in the partial parallel data block.

Once the partial parallel data block is assembled on the bit assembly register 303 with its corresponding shadow bits on the shadow register 306, these values are transferred to a target register in a partial parallel write by setting the read bit assembly register signal 353 to a logical "1" which causes the output driver 331 to place the contents of the bit shift register 303 onto the data bus 119. At the same time, the bit assembly register signal 353 also causes the shadow multiplexer 329 to place the contents of the shadow register 306 onto the shadow bus 176. In this manner, the target register will receive both the partial data block via the data bus 119 and the bit validity information via the shadow bus 176 during the performance of a partial parallel write. Note that a logical "1" is transmitted on the shadow bus 176 when it is not being used for a partial parallel write because it enables the destination target registers to receive a full parallel write from another source register.

Also, the read bit assembly register 353 primes the instruction delay 336 through the trigger OR gate 339 which enables a bit write to the bit assembly register 303 in a subsequent instruction.

Figure 4B:
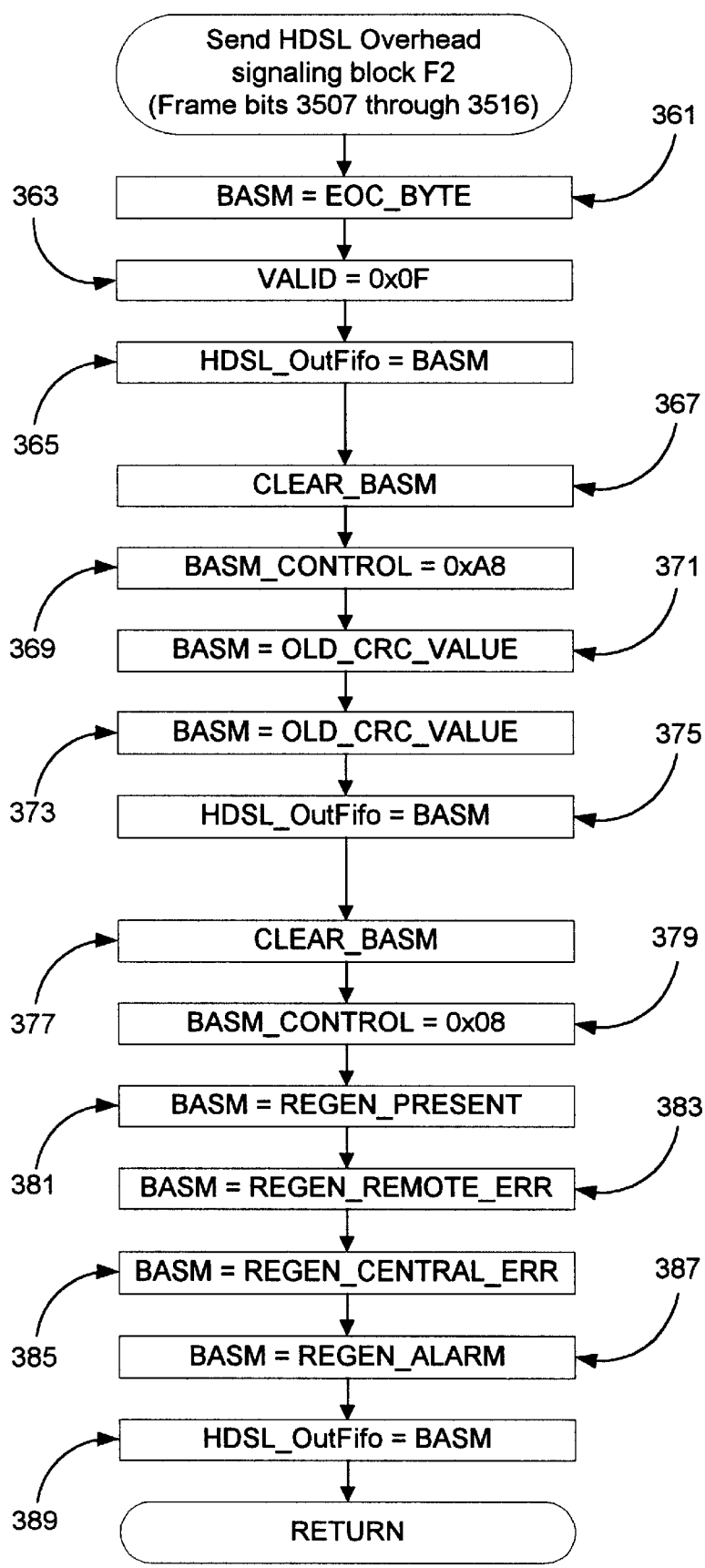
FIG. 4B is a flow chart of an exemplary subroutine of the operating logic controlling the execution of a partial parallel write in the protocol conversion unit of FIG. 2.

Turning to FIG. 4B, shown is a flow chart which shows an example of the operating logic 113 (FIG. 2) in which a partial parallel write is executed. The operating logic 113 below details the particular subroutine of logical operations performed in order to transmit a specific overhead signaling block H0H3 in a two pair High-data-rate Digital Subscriber Line (HDSL) system (which entails bits 3507 through 3516) as outlined in the HDSL E1 data communications protocol of Table 1. Note that the operating logic 113 detailed in FIG. 4B is merely shown as a specific example of the many instructions that make up the operating logic 113 for other applications in which multiple other protocol conversions may be performed. First, in block 361 a data byte is written in a full parallel write to the bit assembly register 303 (FIG. 4A) via the data bus 119. Next, in block 363 a byte is written to the shadow register 306 (FIG. 4A) which marks bits 0 though 3 in the bit assembly register 303 valid with logical "1s" and bits 4–7 of the bit assembly register 303 invalid with logical "0's". In block 365, bits 0 through 3 of the bit assembly register 303 are written to the HDSL output FIFO 146 (FIG. 2). Thereafter, in block 367 all of the shadow bits of the shadow register 306 are set to zero.

The operating logic 113 then progresses to block 369 in which the bit assembly control register 311 is set using a "destination start at 0 with autoincrement" and "source start at 2 with autoincrement" command. This sets the source increment/decrement circuit 323 and the source pointer 313 to bit 2 from the data bus 119 and the destination increment/ decrement circuit 326 and the destination pointer 316 to bit 0 of the bit assembly register 303. Thereafter, in block 371, a data value is written to the data bus 119 with bit 2 being written to bit position 0 of the bit assembly register 303 with a logical "1" written to bit position 0 of the shadow register 306. Next, in block 373, a second data value is written to the data bus 119 with bit 3 being written to bit position 1 of the bit assembly register 303 with a logical "1" written to bit position 1 of the shadow register 306.

The operating logic 113 proceeds to block 375 in which the two assembled bits 0 and 1 of the bit assembly register 303 are written as a partial write to the DSL output FIFO 153. Next, in block 377, the shadow bits of the shadow register 306 are set to zero.

In block 379, the bit assembly control register 311 is set once again so that the destination pointer 316 is set at position 0 of the bit assembly register 303 and the source pointer is set to position 0 of the data bus 119. The source pointer 313 is set not to increment, but the destination pointer 316 is caused to increment automatically.

Next, in block 381, the contents of a source register (as indicated by REGEN_PRESENT) in the protocol conversion unit 100 (FIG. 2) is written to the data bus 119, with the bit at position 0 being written to bit position 0 of the bit assembly register 303 with a logical "1" written to the corresponding bit of the shadow register. In block 383, the contents of a second source register is written to the data bus 119, with the bit at position 0 being written to bit position 1 of the bit assembly register 303 with a logical "1" written to the corresponding bit of the shadow register. Next, in block 385, the contents of a third source register is written to the data bus 119, with the bit at position 0 being written to bit position 2 of the bit assembly register 303 with a logical "1" written to the corresponding bit of the shadow register. Finally, in block 387, the contents of a fourth source register is written to the data bus 119, with the bit at position 0 being written to bit position 3 of the bit assembly register 303 with a logical "1" written to the corresponding bit of the shadow register.

Thereafter, the contents of the bit assembly register 303 are written to the DSL output FIFO 146 as a partial parallel write with valid bits 0–3. Thereafter, the subroutine ends.

The partial parallel write capability of the protocol conversion unit as described provides an advantage in that the protocol conversion unit 100 is not weighted down with a large number of instructions that would allow a partial parallel write with only full parallel write capability. Such instructions are of the type which contribute to the von Neuman bottleneck experienced in similar processors without the partial parallel write capability as known in the art. In fact, the partial parallel write capability described herein improves the processing speed of such information by a factor of up to 6 based on a side by side comparison with a conventional standard type of processor using a High-data-rate Digital Subscriber Line (HDSL) framing protocol.

Figure 5:
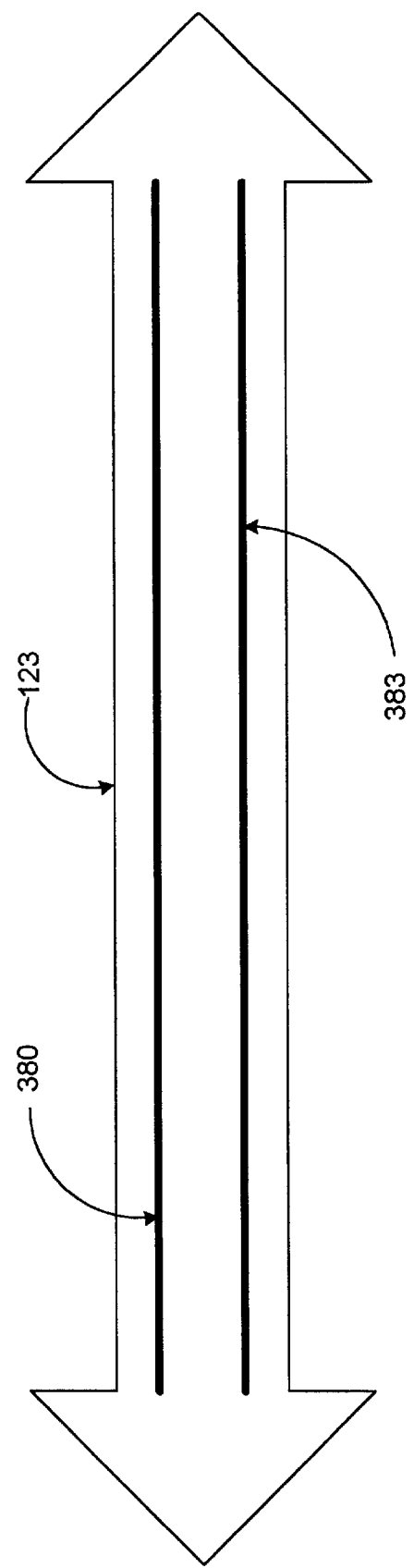
FIG. 5 is a drawing of the bit bus employed in the protocol conversion unit of FIG. 2.

The protocol conversion unit 100 further includes the ability to perform a bit write from the bit bus 123. Turning to FIG. 5, shown is the bit bus 123 which comprises a first conductor 380 to transfer the direct bit write 221 (FIG. 3) and a second conductor 383 to transfer the bit write command 218 (FIG. 3).

Turning back to FIG. 2, the instruction decoder 109 facilitates a bit write by setting the bit write command high which enables a write from the instruction decoder 109 to the most significant bit (MSB) in the FIFO register circuit 200 described previously with reference to FIG. 3. The PSP circuit 169 may also write a bit to another register via the bit bus 123 as shown.

In addition to the forgoing discussion, the protocol conversion unit further includes previously mentioned task specific circuits, namely, the CRC generator 166 and the PSP circuit 169 to facilitate the performance of the logical functions performed in a manner that reduces the number of processor instructions and liberates processor time for other tasks. Although brief discussion of these circuits is offered herein, a more detailed description of the CRC generator 166 is provided in the related patent application entitled "System and Method for Generating Error Checking Data in a Communications System", filed on even data herewith and assigned Ser. No. 09/164,921 the entire text of which is incorporated herein by reference. Also, a more detailed description of the PSP circuit 169 is provided in the related patent application entitled "System and Method for Data Alignment in a Communications System", filed on even date herewith and assigned Ser. No. 09/164,329 the entire text of which is incorporated herein by reference.

Figure 6:
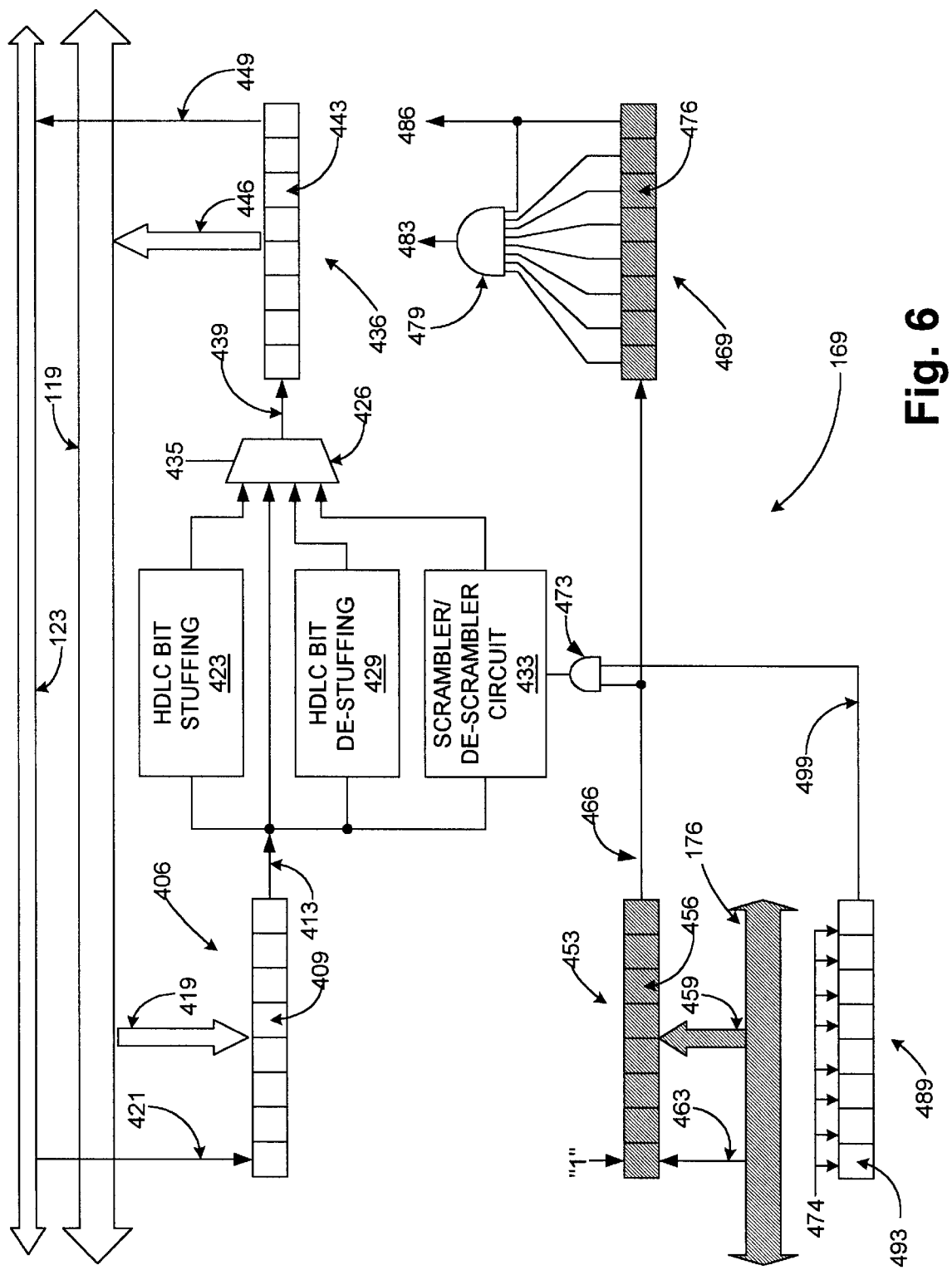
FIG. 6 is a block diagram of the parallel-to-serial-to-parallel circuit employed in the protocol conversion unit of FIG. 2.

Turning to FIG. 6, shown is a block diagram of a parallel-to-serial-to-parallel (PSP) circuit 169 according to the present invention. The PSP circuit 169 is advantageously designed to perform byte alignment functions for specific data communications protocols as well as additional functions as will be discussed herein. The PSP circuit 169 includes an input bit shift register 406 which is electrically coupled to the data bus 119.

Electrically coupled to the data bus 119 is an input bit shift register 406. The input bit shift register 406 is comprised of a predetermined number of input register positions 409 and a bit shift output 413. The input bit shift register 406 generally comprises a predetermined number of D flip-flops, each D flip-flop acting as an input register position 409. The input bit shift register 406 can receive a full or partial parallel write 419 from the data bus 119. The input bit shift register 406 can also receive a bit write 421 from a bit bus 123 associated with the rest of a processor circuit of which the PSP circuit 169 is a part. A bit write 421 is received from the bit bus 123 and the parallel write 419 refers to all input register positions 409 receiving a bit from the entire data bus 119. A partial parallel write 419 is performed like a parallel write, except not all bits received from the data bus 119 are valid, as will be discussed.

The bit shift output 413 is applied to a high-level data link control (HDLC) bit stuffing circuit 423. An output from the HDLC bit stuffing circuit 423 is applied to a first input of a control multiplexer 426. The bit shift output 413 is also applied to a second input of the control multiplexer 426, an HDLC bit de-stuffing circuit 429, and a scrambler/de-scrambler circuit 433. An output from the HDLC bit de-stuffing circuit 429 is applied to a third input of the control multiplexer 426, and an output from the scrambler/de-scrambler circuit 433 is applied to a fourth input of the control multiplexer 426. The control multiplexer 426 includes a control input 435 which determines which control multiplexer input is applied to the control multiplexer output. The control input 435 is received from the a control and address bus of a processor circuit of which the PSP circuit 169 is a part.

The PSP circuit 169 also includes an output bit shift register 436. The output of the control multiplexer 426 is received as a bit shift input 439 of the output bit shift register 436. The output bit shift register 436 generally comprises a predetermined number of D flip-flops, each D flip-flop acting as an output register position 443. In the preferred embodiment, the number of output register positions 443 is equal to the number of input register positions 409 of the input bit shift register 406. The outputs of the D flip-flops are coupled to both the data bus 119 and to the input of an adjacent D flip-flop to facilitate bit shifting, with the exception of the right most D flip flop output which is coupled only to the data bus 119. The output bit shift register 436 can be read by a processor in a parallel read 446. Also a bit read 449 to the bit bus 123 may be performed. When a parallel read 446 is executed, a processor reads the outputs of all of the output register positions 443 through the data bus 119. When a bit read 449 is executed, the output of the least significant bit of the output bit shift register 436, which is the output of the right most output register position 443, is read to the bit bus 123.

The PSP circuit 169 further includes an input shadow register 453 with a number of shadow register positions 456 equal to the number of input register positions 409 of the input bit shift register 406. The input shadow register 453 can receive a partial parallel or a full parallel register write 459 from the shadow bus 176. The most significant bit 463 of the input shadow register 453 receives a logical "1" upon a bit write. The input shadow register 453 further includes a shadow register output 466 which is applied to an input of an output shadow register 469. The shadow register output 466 is also applied to an input of a scrambler/de-scrambler AND gate 473.

The output shadow register 469 comprises a number of register positions 476 equal to the number of output register positions 443. Also, similar to the output bit shift register 436, the output shadow register 469 comprises a number of cascaded D flip-flops (not shown). Each output of the respective register positions 476 of the output shadow register 469 is applied to one of a number of inputs of a register write AND gate 479, which provides a full parallel write available output 483. The output of the register position 476 which holds the least significant bit of the output shadow register 469 provides a bit write available output 486.

In addition, the PSP circuit 169 includes a scramble enable register 489 with a number of register positions 493 equal to the number of input register positions 409 of the input bit shift register 406. The register positions 493 employ cascaded D flip flops. Each register position 493 of the scramble enable register 489 receives a scramble enable signal input 474 which is a logical "1" for scrambling and a logical "0" if the data is not to be scrambled. A scramble register output 499 is applied to a second input of the scrambler/de-scrambler AND gate 473. The output of the scrambler/de-scrambler AND gate 473 enables the operation of the scrambler/de-scrambler circuit 433.

Next the operation of the PSP circuit 169 is described. The PSP circuit 169 is particularly suited for performing the task of byte alignment. This function may be necessary, for example, for communications protocols which package data in bytes such as asynchronous transfer mode (ATM). When data is translated from an unspecified protocol to an ATM protocol, it happens that the data information is not always byte aligned with the data bus in that the data bus will process parts of two different bytes as the data bytes are offset by a random number of bits. In order to align data bytes with the data bus, a signal is applied to the control input 435 which causes the second multiplexer input to be applied to the output of the control multiplexer 426, thereby directly coupling the bit shift output 413 to the bit shift input 439. Next, a predetermined number of bits are written from the data bus 119 to the input bit shift register 406 in a number of bit writes 421. The actual number of bit writes 421 performed depends upon the particular bit offset necessary to achieve byte alignment.

A logical "1" is written to the input shadow register 453 corresponding to the bit writes 421 to indicate that these bits are valid data. These initial bits are shifted all the way to the right most output register positions 443 of the output bit shift register 436. The corresponding bits in the input shadow register 453 are simultaneously shifted to the right into register positions 476 which mirror the bits in the output bit shift register 436. The precise bit shifting operation performed in the input shadow register 453 and the input bit shift register 406 will be discussed in later text.

After an appropriate number of offset bits sit in the right most output register positions 443 of the output bit shift register 436, an entire non-aligned byte is written to the input bit shift register 406 in a parallel write 419 with a shadow register write 459 of logical "1's" being written to the input shadow register 453. The appropriate number of bits out of those written to both the input bit shift register 406 and the input shadow register 453 are shifted into the remaining empty left most register positions of the output bit shift register 436 and the output shadow register 469. When the output bit shift register 436 is full as indicated by a full output shadow register 469 (with logical "1's), then a logical "1" is seen at the full parallel write available output 483. This is detected by processor on a control bus (not shown). Thereafter, a parallel read 446 from the output bit shift register 436 to the data bus 119 is performed, the data being byte aligned. The remaining bits in the input bit shift register 406 are shifted to the output bit shift register 436 and the process is repeated by writing a new non-aligned byte to the input bit shift register 406. All input data is similarly shifted to achieve byte alignment with the number of offset bits remaining in the PSP circuit 169.

Note that although the above discussion describes full register reads, a bit read 449 may also be performed when the processor is alerted to the existence of a bit to read in the right most output register position 443 of the output bit shift register 436 as indicated by a logical "1" at the bit write available output 486 which is made available an a status register (not shown).

The PSP circuit also allows partial byte writes to the input bit shift register 406. In actuality, a full parallel write 419 is performed during a partial parallel write, however, only the bits which comprise actual or valid data bits receive a logical "1" in the corresponding input shadow register 453. The PSP circuit 169 is thus able to discern whether a particular parallel write 419 is in fact a partial byte write or a full byte write. The occurrence of a partial write is discussed in greater detail in later text.

The PSP circuit 169 may also be used to perform a bit stuffing operation as required by some communications protocols such as, for example, an HDLC protocol. In such a case, the control input 435 is set to cause the first input of the control multiplexer 426 to be applied to the control multiplexer output. The HDLC bit stuffing circuit 423 is coupled between the input bit shift register 406 and the output bit shift register 436. The HDLC bit stuffing circuit 423 causes a predetermined number of control bits to be injected into the bit stream between specified numbers of data bits according to a specific criteria. Such control bits are merely shifted into the output bit shift register 436 as needed. Similarly, the HDLC bit de-stuffing circuit 429 periodically removes the same control bits from the data stream accordingly. The HDLC bit de-stuffing circuit 429 is enabled by applying a control input 435 to the control multiplexer 426 that causes the third multiplexer input to be read to the multiplexer output. Similarly then, the HDLC bit de-stuffing circuit 429 is coupled between the input bit shift register 406 and the output bit shift register 436.

Finally, the PSP circuit 169 may be used to perform a scrambling or de-scrambling operation. To function as a scrambler or de-scrambler, the control input 435 is set to cause the control multiplexer 426 to apply the fourth multiplexer input to the multiplexer output, where the data shifted from the input bit shift register 406 is sent through the scrambler/de-scrambler circuit 433. In this manner, the scrambler/de-scrambler circuit 433 is coupled between the input bit shift register 406 and the output bit shift register 436. The scrambler/de-scrambler circuit 433 operates on all valid data, whether they be a bit write 421 or a parallel write 419, whether it be a full byte or a partial byte. A previously mentioned, a logical "1" is written into shadow register positions 456 of the input shadow register 453 which correspond to input register positions 409 of the valid data written into the input bit shift register 406. In addition, a logical "1" is written to each register position in the scramble enable register 489. As the bits are simultaneously shifted out of the input bit shift register 406, the input shadow register 453, and the scramble enable register 489, the scrambler/de-scrambler AND gate 473 outputs a logical "1" which enables the scrambler/de-scrambler circuit 433 which operates on the valid data. Where data is invalid as indicated by a logical "0" in the input shadow register 453, the scrambler/de-scrambler AND gate 473 outputs a logical "0" and the operation of the scrambler/de-scrambler circuit 433 is disabled. In this manner, the PSP circuit 169 scrambles and de-scrambles data based on the predefined criteria of a specific data communications protocol.

Figure 7:
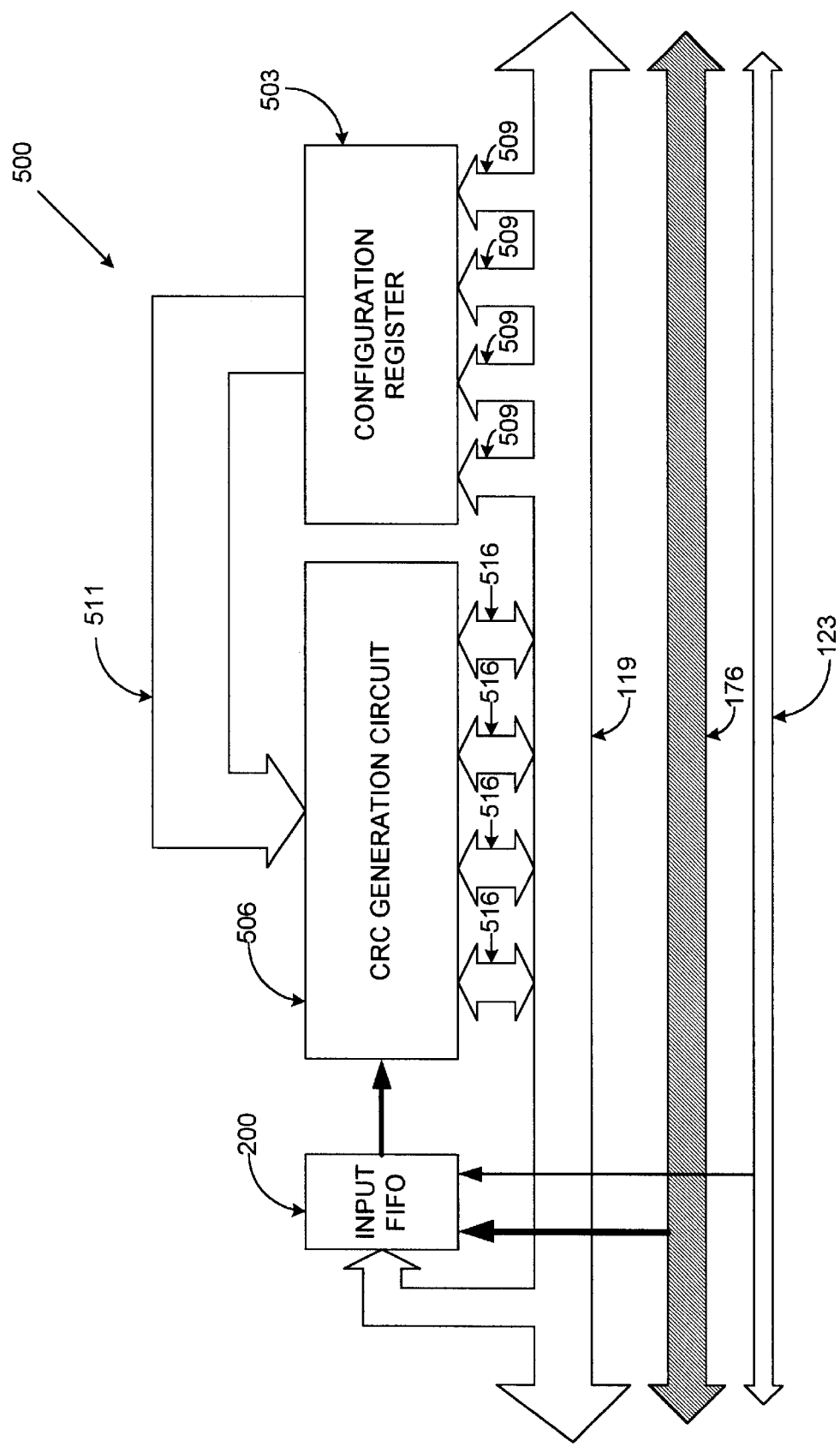
FIG. 7 is a block diagram of the cyclic redundancy check generator employed in the protocol conversion unit of FIG. 2.

Referring next to FIG. 7, shown is a cyclic redundancy check (CRC) circuit 500 according to the present invention. The CRC circuit 500 is advantageously generates generate error checking information to be transmitted with corresponding data for any number of data communications protocols.

The cyclic redundancy check circuit 500 features a configuration register 503 and a CRC generation circuit 506. The configuration register 503 is receives data from the data bus 119 through one of four CRC input connections 509. The configuration operates on this data to create a particular CRC configuration which is communicated to the CRC generation circuit 506 through the configuration coupling 511. The FIFO register circuit 200 is electrically coupled to the data bus 119, the shadow bus 176, and the bit bus 123. Data may be received from the data bus 119 or the bit bus 155 and then relayed in series to the CRC generation circuit 506. The shadow bus 176 is employed to facilitate a partial parallel write and a bit write to the FIFO register circuit 200 employed by the CRC generator 166. The output of the CRC generator 166 is made available to the data bus 119 via the CRC outputs 516.

The general operation of the CRC circuit 500 is now described. A specific configuration code which indicates the type of protocol conversion to be performed is input into the configuration register 503 from the data bus 119. The configuration register 503 enables various components of the CRC generation circuit 506 to perform the cyclic redundancy check processing function using the data received as required by the particular protocol conversion being performed. Serial data is read into the CRC generation circuit 506 from the FIFO register circuit 200 and is processed by the CRC generation circuit 506. The CRC output is made available on the data bus 119 via the CRC outputs 516.

The CRC generation circuit 506 advantageously employs a configurable circuit in which CRC data is generated using a bit shift register which is configurable to multiple lengths, thereby allowing the CRC generator 166 to generate CRC data for a multitude of data communications protocols.

Turning back to FIG. 2, the PIU output FIFO 139 and the PIU input FIFO 143 provide are parallel first-in-first-out devices which transmit and receive parallel data to and from a physical interface unit (not shown) such as the physical interface unit described in the United States patent application entitled "Multiple Protocol Interface and Method for Use in a Communications System", filed on even data herewith, and assigned Ser. No. 09/164,886, the entire text of which is incorporated herein by reference.

The general purpose input and output FIFOs 153 and 156 are similar to the PIU input and output FIFOs 139 and 143 facilitate parallel data transfer to and from an external processor device. Finally, the DSL input FIFO 149 is similar to the output bit shift register 436 (FIG. 6) as discussed.

The protocol conversion unit 100 can be programmed to convert any one of multiple data communications protocols into a second data communications protocol as discussed with reference to FIG. 1. Such programmable features are facilitated by the protocol conversion unit 100 due to the fact that significant processor time is saved using the various task specific circuits and other features described above as compared to the operations of conventional processor circuits.

The present invention provides a distinct advantage in that significant time is design and production time is saved as compared to conventional protocol conversion units as the protocol conversion unit 100 need only be reprogrammed for new evolving standards. Also, if changes are made to an evolving protocol standard, the protocol conversion unit 100 is easily adapted to such alterations by simple reprogramming. A further advantage includes a significantly reduced simulation time for the protocol conversion unit 100 to examine a protocol conversion program for errors. Specifically, one can break down the various functions by code to perform the simulation of all functions. Such simulation with the protocol conversion unit 100 may take minutes as opposed to hours and even days with conventional dedicated conversion devices.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, it is claimed:

1. An apparatus for a data communication system, comprising;
   a protocol conversion unit having a processor having a bit write operation, the bit write operation allowing the processor to write a single predefined data bit into a target register.

2. An apparatus for a data communication system, comprising;
   a protocol conversion unit having a processor having a partial parallel data transfer operation, the partial parallel data transfer operation allowing the processor to transfer a predefined partial parallel data value to a target register.

3. The protocol conversion unit of claim 1, further comprising a bit bus coupling an instruction decoder to a plurality of input registers, the input registers being associated with a specific logical circuit, wherein the bit bus is used to accomplish the bit write operation.

4. The protocol conversion unit of claim 2, further comprising:
   a bit assembly register;
   a data bus, the bit assembly register transferring the partial parallel data to the target register over the data bus; and
   a shadow bus controlled by the bit assembly register, the bit assembly register transferring a shadow data associated with the partial parallel data to the target register over the shadow bus.

5. The protocol conversion unit of claim 4, wherein the target register further comprises:

a data register configured to receive the partial parallel data from the data bus; and a shadow register configured to receive the shadow data from the shadow bus, the shadow data indicating at least one valid data bit in the partial parallel data and at least one invalid data bit in the partial parallel data; and a bit shift operation.

6. The protocol conversion unit of claim 5, wherein the bit shift operation is configured to shift both the valid and invalid data bits of the partial parallel data through the data register and the shadow data through the shadow register, wherein the data register is shifted synchronously with the shadow register, the target register ignoring the invalid data bits.

7. The protocol conversion unit of claim 3, wherein the bus comprises two conductors.

8. protocol conversion unit, comprising:

a processor having means for performing a bit write operation allowing the processor to write a single predefined data bit to a target register.

9. A protocol conversion unit, comprising:

a processor having means for performing a partial parallel data transfer allowing the processor to transfer a predefined partial parallel data value to a target register.

10. The protocol conversion unit of claim 8, wherein the means for performing the bit write operation further comprises a means for coupling an instruction decoder to a plurality of input registers, the input registers being associated with a plurality of logical circuits.

11. The protocol conversion unit of claim 9, further comprising:

means for translating a full parallel data transfer into a partial parallel data transfer;

means for transferring the partial parallel data to the target register; and means for indicating the validity of data bits in the partial parallel data.

12. The protocol conversion unit of claim 11, wherein the target register further comprises:

means for receiving the partial parallel data; and means for receiving the indication of data bit validity; and means for eliminating an invalid data bit in the partial parallel data.

13. The protocol conversion unit of claim 12, wherein means for eliminating an invalid data bit further comprises a means for shifting only a valid data bit of the partial parallel data to a serial output.

14. A method for processing data comprising the steps of:

performing a bit write operation within a protocol conversion unit having a processor, wherein the bit write operation allowing the processor to write a single predefined data bit to a target register.

15. A method for processing data comprising the steps of:

performing a partial parallel data transfer within a protocol conversion unit having a processor, wherein the partial parallel data transfer allowing the processor to transfer a predefined partial parallel data value to a target register.

16. The method of claim 14, wherein the step of performing the bit write operation further comprises the step of coupling an instruction decoder to a plurality of input registers with a bit bus, the input registers being associated with a plurality of logical circuits.

17. The method claim 15, further comprising steps of:

translating a full parallel data transfer into a partial parallel data transfer;

transferring the partial parallel data to the target register; and indicating the validity of data bits in the partial parallel data.

18. The method of claim 17, further comprising the step of:

receiving the partial parallel data; and receiving the indication of data bit validity; and eliminating an invalid data bit in the partial parallel data.

19. The method of claim 18, wherein the step of eliminating an invalid data bit further comprises the step of shifting only a valid data bit of the partial parallel data to a serial output.

\* \* \* \* \*